United States Patent
Goodwin et al.

(10) Patent No.: US 12,205,053 B1
(45) Date of Patent: Jan. 21, 2025

(54) MODELING OF INFORMATION TECHNOLOGY FAILURES OF ENTERPRISE COMPUTING SYSTEMS

(71) Applicant: Wells Fargo Bank, N.A., San Francisco, CA (US)

(72) Inventors: Michael Goodwin, Denver, CO (US); Stacy R. Henryson, Clive, IA (US); Brian Karp, San Francisco, CA (US); Manoranjan Kumar, San Francisco, CA (US); Monte Nash, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1022 days.

(21) Appl. No.: 17/119,770

(22) Filed: Dec. 11, 2020

Related U.S. Application Data

(60) Provisional application No. 63/052,832, filed on Jul. 16, 2020.

(51) Int. Cl.
*G06N 7/01* (2023.01)
*G06F 3/04842* (2022.01)
(Continued)

(52) U.S. Cl.
CPC ......... *G06N 7/01* (2023.01); *G06F 16/24578* (2019.01); *G06F 16/285* (2019.01); *G06N 20/00* (2019.01); *G06F 3/04842* (2013.01)

(58) Field of Classification Search
CPC ........ G06N 20/00; G06N 7/01; G06F 16/285; G06F 16/24578; G06F 2119/02;
(Continued)

(56) References Cited

U.S. PATENT DOCUMENTS

| | | | |
|---|---|---|---|
| 8,706,651 B2 * | 4/2014 | Horvitz | G06N 7/01 706/12 |
| 10,360,129 B2 * | 7/2019 | Borghetti | G06F 11/0709 |

(Continued)

FOREIGN PATENT DOCUMENTS

| | | | |
|---|---|---|---|
| CN | 102637143 A | * | 8/2012 |
| CN | 107222875 A | | 9/2017 |

(Continued)

OTHER PUBLICATIONS

Zafiropoulos, E.P, and E.N Dialynas. "Reliability Prediction and Failure Mode Effects and Criticality Analysis (FMECA) of Electronic Devices Using Fuzzy Logic." The International journal of quality & reliability management 22.2 (2005): 183-200. Web. (Year: 2005).*

(Continued)

*Primary Examiner* — Andrew L Tank
(74) *Attorney, Agent, or Firm* — Foley & Lardner LLP

(57) ABSTRACT

Disclosed are techniques for using machine learning models to more reliably predict likelihoods of application failure. A model is trained to identify and display events that may cause high severity application failures. Logistic regression may be used to fit the model such that application features are mapped to a high severity event flag. Significant features of applications that relate to the high severity flag may be selected using stepwise regression. The identified applications may be displayed on a graphical user interface for review and reprioritization. Information may be ranked and displayed according to multiple different ranking criteria, such as one ranking generated by a first model, and another determined by one or more users. The multiple ranking criteria may be used to inform steps taken, and/or to retrain or tune the parameters of the model for subsequent predictions or classifications.

20 Claims, 10 Drawing Sheets

(51) Int. Cl.
*G06F 16/2457* (2019.01)
*G06F 16/28* (2019.01)
*G06N 20/00* (2019.01)

(58) Field of Classification Search
CPC .................. G06F 11/008; G06F 30/20; G06F 30/04842; G06Q 10/0635
See application file for complete search history.

(56) References Cited

U.S. PATENT DOCUMENTS

| | | | |
|---|---|---|---|
| 10,360,387 B2 * | 7/2019 | Jou | H04L 63/1433 |
| 10,386,271 B1 * | 8/2019 | King | G01M 99/005 |
| 10,572,327 B2 * | 2/2020 | Shuvali | G06F 11/0715 |
| 10,803,403 B2 * | 10/2020 | Ben-Or | G06Q 30/0185 |
| 2011/0202821 A1 * | 8/2011 | Roy | G06Q 30/02 715/201 |
| 2015/0347906 A1 * | 12/2015 | Bodda | G06Q 10/20 706/52 |
| 2016/0019460 A1 * | 1/2016 | Li | G06F 16/24578 719/318 |
| 2017/0032130 A1 * | 2/2017 | Joseph Durairaj | H04L 63/1416 |
| 2017/0091633 A1 * | 3/2017 | Vemula | G06Q 10/06 |
| 2017/0230229 A1 * | 8/2017 | Sasturkar | H04L 41/0631 |
| 2018/0174067 A1 | 6/2018 | Spiro et al. | |
| 2020/0322432 A1 * | 10/2020 | Ghatak | H04L 67/10 |
| 2021/0004675 A1 | 1/2021 | Ramesh et al. | |

FOREIGN PATENT DOCUMENTS

| | | | | |
|---|---|---|---|---|
| CN | 108710637 B | 10/2018 | | |
| CN | 109034191 A | 12/2018 | | |
| CN | 109447184 A | 3/2019 | | |
| CN | 109598293 A | 4/2019 | | |
| WO | WO-2019072200 A1 * | 4/2019 | .......... | G06F 18/2113 |
| WO | WO-2020014181 A1 * | 1/2020 | .......... | G06F 21/552 |

OTHER PUBLICATIONS

Z. Han, X. Li, Z. Xing, H. Liu and Z. Feng, "Learning to Predict Severity of Software Vulnerability Using Only Vulnerability Description," 2017 IEEE International Conference on Software Maintenance and Evolution (ICSME), Shanghai, China, 2017, pp. 125-136, doi: 10.1109/ICSME.2017.52. (Year: 2017).*

G. Yang, T. Zhang and B. Lee, "Towards Semi-automatic Bug Triage and Severity Prediction Based on Topic Model and Multifeature of Bug Reports," 2014 IEEE 38th Annual Computer Software and Applications Conference, Vasteras, Sweden, 2014, pp. 97-106, doi: 10.1109/COMPSAC.2014.16. (Year: 2014).*

Arunajadai "Stepwise Logistic Regression", IARS, 2009, pp. 285-286.

Liu et al. "Data Cleansing for Web Information Retrieval using Query Independent Features", InterScience, 2007, pp. 1884-1898.

Yen et al. "Under-Sampling Approaches for Improving Prediction of the Minority Class in an Imbalanced Dataset", ICIC, 2006, pp. 731-740.

* cited by examiner

MODELING OF INFORMATION TECHNOLOGY FAILURES OF ENTERPRISE COMPUTING SYSTEMS

CROSS-REFERENCE TO RELATED APPLICATIONS

This application claims priority to U.S. Provisional Patent Application No. 63/052,832 filed Jul. 16, 2020, and entitled "Business Continuity Planning Predictive Model," the entirety of which is incorporated herein by reference.

TECHNICAL FIELD

The present disclosure relates generally to modeling of information technology (IT) failures and generation of classifiers for predicting probabilities of high severity events based on application features so as to identify and address states with high likelihoods of IT and operational interruptions.

BACKGROUND

An enterprise continuity plan is a plan that identifies processes, instructions, or backups systems in the event that a disruption in an enterprise occurs. The disruption to an enterprise may be drastic such that one or more operations of the enterprise ceases or otherwise is significantly inhibited. Examples of such events may include cyber-attacks, disasters such as fires or floods, hardware computing malfunctions, pandemics or other health emergencies, national security or other national concerns, and/or the failure of critical software applications. Generally, events vary in severity, and various responses may be necessary to address the disruption and continue operational flow.

SUMMARY

Various embodiments of the disclosed inventions relate to a computer-implemented method, comprising: retrieving an application dataset comprising application data for a plurality of applications in a first application set; extracting a first feature set comprising features for each of the applications in the first application set; identifying a feature subset comprising one or more of the features that are independent variables; determining one or more parameters for each of the independent variables in the feature subset; generating a training dataset comprising the first application set and, for each application in the first application set, the one or more parameters determined for each independent variable in the feature subset; training a predictive model based on the training dataset by applying one or more supervised learning techniques such that the predictive model is tuned to receive application features for an application and provide a probability of a high severity event for the application; determining the probability of the high severity event for each application in a second application set based on one or more extracted features corresponding to applications in the second application set, wherein determining the probability of the high severity event for the application comprises feeding the extracted features to the predictive model; and storing and displaying the probability associated with each application in the second application set.

Various embodiments of the disclosed inventions relate to a computer-implemented method, comprising: determining a probability of a high severity event for each application in a first application set based on one or more extracted features corresponding each application in the first application set, wherein determining the probability of the high severity event for the application comprises feeding the one or more extracted features to a predictive model generated by: retrieving an application dataset comprising application data for a plurality of applications in a second application set; extracting a first feature set comprising features for each of the applications in the second application set; identifying a feature subset comprising one or more of the features that are independent variables; determining one or more parameters for each of the independent variables in the feature subset; generating a training dataset comprising the second application set and, for each application in the second application set, the one or more parameters determined for each independent variable in the feature subset; and training the predictive model based on the training dataset by applying one or more supervised learning techniques such that the predictive model is tuned to receive application features for an application and provide a probability of a high severity event for the application; and storing and displaying the probability associated with each application in the first application set.

Various embodiments of the disclosed inventions relate to a computer-implemented method, comprising: determining, based on a received trigger, a probability of a future event for each application in an application set, wherein determining the probability of the future event for each application in the application set comprises feeding one or more features to a predictive model, the one or more features corresponding to features of each of the applications in the application set, the predictive model tuned to receive the one or more features corresponding to applications in the application set and provide the probability of the future event for each application in the application set; ranking the probability of the high-severity event for each application in the application set according to the predictive model; displaying the ranked probability of the high-severity event for a number of applications in the application set on one or more pages of a graphical user interface, the graphical user interface having one or more selectable graphical components; and in response to a user interacting with the one or more graphical components, modifying the number of displayed applications, the ranking of each of the applications in the application set, and the probability of the high-severity event for one or more applications in the application set.

Various embodiments of the disclosed inventions relate to a system comprising a memory having computer-executable instructions, and a processor configured to execute the instructions to: determine, based on a received trigger, a probability of a future event for each application in an application set, wherein determining the probability of the future event for each application in the application set comprises feeding one or more features to a predictive model, the one or more features corresponding to features of each of the applications in the application set, the predictive model tuned to receive the one or more features corresponding to applications in the application set and provide the probability of the future event for each application in the application set; rank the probability of the high-severity event for each application in the application set according to the predictive model; display the ranked probability of the high-severity event for a number of applications in the application set on one or more pages of a graphical user interface, the graphical user interface having one or more selectable graphical components; and in response to a user interacting with the one or more graphical components, modify the number of displayed applications, the ranking of each of the applications in the application set, and the probability of the high-severity event for one or more applications in the application set.

These and other features, together with the organization and manner of operation thereof, will become apparent from the following detailed description and the accompanying drawings.

BRIEF DESCRIPTION OF THE DRAWINGS

Various example embodiments of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
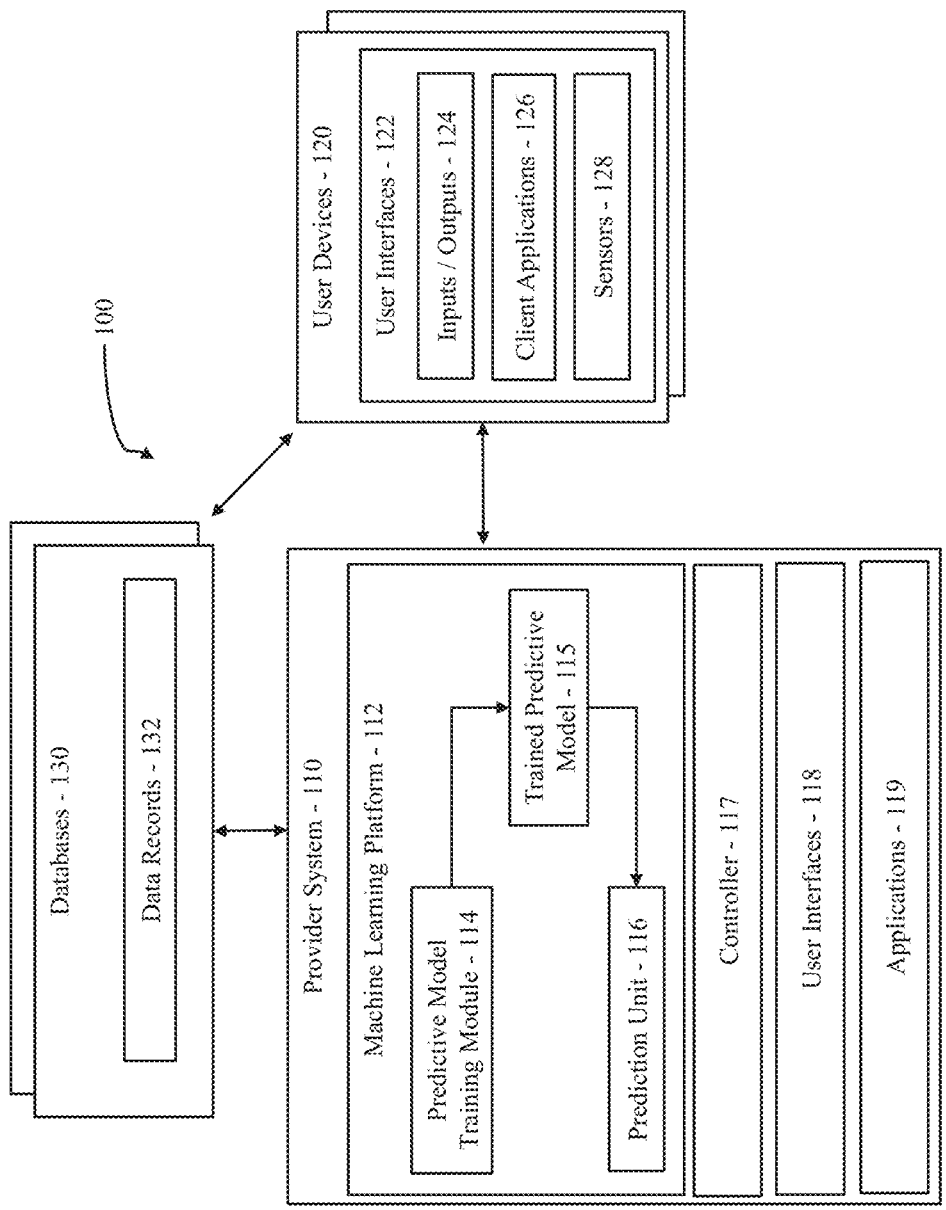
FIG. 1 is a block diagram of an example computer implemented system, with a provider system in communication with various systems and devices, according to various potential embodiments.

Hereinafter, example arrangements will be described in more detail with reference to the accompanying drawings, in which like reference numbers refer to like elements throughout. The disclosed inventions, however, can be embodied in various different forms, and should not be construed as being limited to only the illustrated arrangements herein. Rather, these arrangements are provided as examples so that this disclosure will be thorough and complete, and will fully convey the aspects and features of embodiments of the present inventions to those skilled in the art. Accordingly, processes, elements, and techniques that are not necessary to those having ordinary skill in the art for a complete understanding of the aspects and features of the disclosed embodiments may not be described. Unless otherwise noted, like reference numerals denote like elements throughout the attached drawings and the written description.

While a continuity plan may provide information on what to do in case of a high severity incident, it is reactive in nature. In addition to having a continuity plan, it would thus be advantageous to have a proactive solution to address situations in which events may occur. In various embodiments, applications with a high likelihood of causing a continuity disruption may be identified such that factors resulting in applications having a high likelihood of a continuity disruption can be proactively mitigated. Applications may be ranked based on the probability of the application likely causing high severity events.

The identification of the ranked applications with high probabilities of causing high severity events is important for users to proactively mitigate factors causing the application to have a high probability of causing a high severity event. The identification of the ranked applications may be presented in interactive interfaces such that one or more users are able to address potential issues with applications in states that lead to relatively high probabilities of causing a high severity events. The identification of the ranked applications may be displayed in conjunction with additional criteria (such as user-determined rankings) such that severity of the identified and ranked applications are put into a perspective that supplement a user's understanding of the identified and ranked applications. Accordingly, the user may review the displayed applications and act to mitigate applications with a high probability of resulting in high severity events, without significant discussion of the displayed applications.

Various embodiments relate to systems, methods and devices for predicting and displaying the probability of high severity events that could be caused by various applications (e.g., the failure of an application). Severity types may be created to classify the severity of events that may be caused by the failure of various applications. High severity events may be so rare and severe that they may be a proxy for information technology and operational disruption. In the present disclosure, severities are categorized along a spectrum from type 1 to type 5 in decreasing order of severity. Severity types 1 and 2 will be classified as high severity events, however it should be appreciated that other classifiers, ranks, and identifiers may be used to identify high severity events.

Severity types 3, 4 and 5 may be classified as low severity events. Severity type 5 events may be events with a low probability of information technology and operational disruption. For instance, severity type 5 events may cause inconveniences. An example of a severity type 5 event may be a PC or hard drive issue. Other types of severity classifiers, identifiers, and rankings may be created to describe and identify a source (such as an application) that has the ability to disrupt an enterprise (e.g., by failing and causing information technology and operational disruption).

A target restoration period may reflect the severity of the event. One or more users may determine one or more threshold target restoration periods representative of severity types. An event that must be addressed immediately (e.g., within 2 hours of the event occurring) such that operations can be restored to their normal and functioning state may be a severity type 1 event. Similarly, an event that must be addressed quickly (e.g., within 5 hours of the event occurring) may be a severity type 2 event.

One or more thresholds may be determined to represent a type of severity event. For example, a threshold may be determined for a number of users disrupted. A user and/or system may determine that if, for example, at least 80% (or other threshold) of the users are disrupted (e.g., unable to use an application for its intended or primary purpose) based on an application failure, the application is associated with a severity type 1 event. Additionally or alternatively, if, for example, 50-80% (or other range) of the users are disrupted based on an application failure, the application failure is associated with a severity type 2 event. Similarly, if less than, for example, 50% of users are affected, a severity 3, 4, or 5 may be involved (e.g., 30-50% or other range may correspond with severity type 3, 10-30% or other range may correspond with severity type 4, and less than 10% of users or other threshold may correspond with severity type 5).

In an alternate example, a threshold may be determined for a length of disruption time. A user and/or system may determine that events resulting in indefinite user disruption (e.g., disruption until the event is addressed) may be indicative of an application resulting in a severity type 1 event. Additionally or alternatively, events resulting in, for example, a 5-10 hour user disruption may be indicative of the application resulting in a severity type 2 event. In contrast, events that could result in a 0-60 minute user disruption (e.g., a delay in performing tasks) may be indicative of the application resulting in a severity type 4 or 5 event.

In an alternate example, a threshold may be determined for a number of disrupted applications and/or servers. A user and/or system may determine that an application failure affecting, for example, 90% or 95% (or other threshold) of applications in a system (e.g., one application affecting 90% or 95% of the other downstream and/or upstream applications) would be deemed a severity type 1 event. Additionally or alternatively, an application failure affecting, for example, 75%-90% or 80-95% (or another range) of applications in a system (e.g., one application affecting 80-95% of the other downstream/upstream applications) may be deemed result in a severity type 2 event. In some embodiments, the greater the number of related applications that cannot function as intended or are otherwise impacted by the failure of an application, the more likely that failure of that application would correspond with a severity type 1 or type 2.

In an alternate example, a threshold may be determined for a number of computing device crashes (e.g., a computing device becomes entirely unusable, unusable for certain functionalities, or unable to perform certain critical operations, etc.). A user and/or system may determine that application failures resulting in, for example, 50-100% (or another range) of computing device crashes would result in a severity type 1 event. Additionally or alternatively, application failures resulting in, for example, 40-50% of computing device crashes would result in a severity type 2 event.

Additionally or alternatively, one or more combinations of thresholds may be determined to represent a severity type event. For instance, a cyber-security event that affects a majority of users (e.g., 90% of users) with no reasonable workaround (e.g., no available software substitutions), lasting until the resolution of the cyber-security event (e.g., lasting indefinitely) may be severity type 1 event. That is, the severity type 1 event is representative of an event for which three thresholds exceed a certain threshold (e.g., number of users, number of servers or other devices impacted, availability of workaround, duration of event, and/or criticality of application). In certain embodiments, each threshold may be weighted. Further, one or more thresholds may be combined and weighted, the outcome of the combined and weighted threshold passed to one or more subsequent thresholds.

The thresholds may be set by one or more users (e.g., based on user experience with the application). Additionally or alternatively, the thresholds may be automatically determined by one or more systems. For instance, the system may evaluate the application's historic data (e.g., to gauge the impact or downtime experienced following a failure of one or more applications) to classify the severity type associated with the application. Additionally or alternatively, the system may evaluate one or more users, dependent applications, computing devices using the application, and the like, to classify the severity associated with the application. In one example, if the system determines that utilization of a certain set of servers has dropped significantly (e.g., from 95% to 50%), that metric may serve as a proxy for the severity of an event and may, by itself or in combination with other factors, be used in determining severity type.

In various embodiments, the thresholds and ranges for classifying severity types may depend on a categorization for the applications along a range or spectrum, such that 5% of users being impacted for certain "critical" or "essential" applications may correspond with a severity type 1 or 2, while 5% of users being impacted for "non-critical" or "non-essential" applications may correspond with a severity type 5). The criticality of an application may be categorized along a discrete or continuous range (e.g., ranging from 1 for least critical to 10 for most critical).

Applications identified to result in severity type 1 or severity type 2 events may be prioritized. Procedures can be implemented that are associated with the identified applications to reduce the likelihood of the application resulting in a severity type 1 or severity type 2 event.

A predictive model may receive data associated with various applications. Features representative of the various applications may be extracted and used to predict the probability of one or more of the applications being involved in a severity type 1 or 2 event. A computer may run the predictive model for each application in an application dataset, or for sets of related applications, and rank each of the applications (or each set of applications) according to probabilities of resulting in high severity events.

A computer may display the ranked applications to a user. Additionally, the computer may modify the ranked application display according to alternate ranking criteria. The alternate ranking criteria may be criteria determined by a user (or group of users) to provide context to the predictive model rankings in accordance with one or more ranking systems familiar to the users.

In various embodiments, a predictive model may be trained to provide a classifier capable of, for example, accepting, as inputs, states or features of one or more applications in an enterprise IT system and provide, as outputs, probabilities of subsequent high severity events. The predictive model may be trained, for example, using a training dataset that includes features of applications that were previously involved in high severity events. In some embodiments, the model may be retrained on a regular basis (such as each time a new high severity event is detected) using a training dataset that additionally includes features of the applications involved in the new high severity event. In certain embodiments, the model may be retrained periodically (e.g., every week, month, quarter, or year). In some embodiments, the retraining may use training datasets that account for actual outcomes as compared with predicted likelihoods of high severity events. The parameters of the predictive model may be adjusted or updated based on new data that may include, for example, prior predictions, user reprioritizations, newly-added features and state data, etc.

FIG. 1 depicts a block diagram of an example provider computer system 100 implementing a prediction system and communicating with databases and user devices, according to potential embodiments. The system 100 includes a provider computer system 110 (e.g., a computing system of a financial institution or other service provider), which may be implemented using one or more computing devices. The system 100 may also include one or more databases 130 and user devices 120. The components of the system 100 may be communicably and operatively coupled to each other over a network that permits the direct or indirect exchange of data, values, instructions, messages, and the like (represented by the arrows in FIG. 1).

Each system or device in system 100 may include one or more processors, memories, and network interfaces. The memory may store programming logic that, when executed by the processor, controls the operation of the corresponding computing system or device. The memory may also store data. The network interfaces allow the computing systems and devices to communicate wirelessly or otherwise by sending and receiving transmissions via one or more communications protocols. Wireless interfaces may enable, for example, near-field communication (NFC) between two devices located close to each other (e.g., within four centimeters of each other), and may include other protocols such as Bluetooth, Wi-Fi, and/or wireless broadband. The various components of devices in system 100 may be implemented via hardware (e.g., circuitry), software (e.g., executable code), or any combination thereof. Each system and device in system 100 may moreover include a security client which may provide fraud prevention measures and security protections (such as generation of security tokens, authentication of devices, verification of biometric or other security data, etc.). Devices and components in FIG. 1 can be added, deleted, integrated, separated, and/or rearranged in various embodiments of the disclosed inventions.

The systems and devices in system 100 may also include application programming interface (API) gateways to allow the systems and devices to engage with each other via various APIs, such as APIs that facilitate authentication, data retrieval, etc. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may execute one or more APIs or API protocols to make an API "call" to (e.g., generate an API request that is transmitted to) the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users (e.g., name, identification number, biometric data), accounts, dates, functionalities, tasks, etc. In system 100, a system or device may provide various functionality to other systems and devices through APIs by accepting API calls via an API gateway. The API calls may be generated via an API engine of a system or device to, for example, make a request from another system or device.

Provider system 110 may include a machine learning (ML) platform 112, which may include a predictive model training module 114, a trained predictive model 115, and a prediction unit 116. The predictive model training module 114 of ML platform 112 may be used to train and implement a predictive model 115 that may be used by prediction unit 116 to predict whether various applications may result in high severity events. Training module 114 may use a training dataset comprising application features to train the predictive model 115 capable of receiving, for example, application features as inputs and generating as outputs, for example, likelihoods of disruptive events of various severity types. Prediction unit 116 may use the trained predictive model 115 to predict the probability of severity types for applications as a result of current states of applications and the computing environment in which those applications operate.

The provider system 110 may include a controller 117 with a processor and memory with instructions executed by the processor to control operations and functionality of the provider system 110 and components thereof. User interfaces 118 may include input/output (I/O) components that may allow a user to provide inputs (e.g., using a touchscreen, stylus, force sensor for sensing pressure on a display screen, and the like) and provide perceptible outputs (e.g., displays and light sources for visually-perceptible elements, a speaker for audible elements, haptics for perceptible signaling via touch, and the like). User interfaces 118 may include biometric sensors such as fingerprint readers, heart monitors that detect cardiovascular signals, iris scanners, face scanners, and so forth. User interfaces 118 may also include ambient sensors that detect surrounding conditions, such as ambient sights and sounds, and may include cameras, imagers, or other light detectors, and microphones or other sound detectors. User interfaces 118 may also include location and orientation sensors, such as a GPS device, gyroscope, digital compass, accelerometer, etc. Provider system 110 may also run one or more applications 119 that allow users to interact with provider system 110 and input selections for various functionalities.

Provider system 110 may communicate with the user devices 120 to trigger the ML platform 112 and train, access, or modify predictive models 115 in response to a user inputs received via a user device 120. Further, provider system 110 may communicate with databases 130 such that the provider system 110 retrieves data records 132 to use in training models and predicting the probability of severity types of various applications.

User device 120 (e.g., smartphones, tablet computers, desktop computers, and the like) may include a user interface 122, which may include input/output components 124. The input/output components may provide perceptible outputs (e.g., displays and light sources for visually-perceptible elements, a speaker for audible elements, and haptics for perceptible signaling via touch, and the like) that capture ambient signs and sounds (e.g., cameras, microphones, and the like), and/or that allow the user to provide inputs (e.g., using a touchscreen, stylus, force sensor for sensing pressure on a display screen, and the like). The user device 120 may include sensors 128 (such as fingerprint reader, iris scanner, facial recognition scanner, etc.).

The user device 120 may include a client application 126, such as Internet browsing presenting websites, and applications provided or authorized by the entity implementing or administering the provider system 110. A user device 120 may communicate with provider system 110 to display a graphical user interface based on content from the execution of the predictive model 115 from the provider system 110 (e.g., from the prediction unit 116). Provider system 110 may communicate the results of the predictive model 115 to be displayed on the graphical user interface by the client application 126. Users may interact with the graphical user interface of the client application 126 using the input/output features of the user device 120.

User device 120 may also communicate content with database 130 in response to the user device 120 receiving content based on the execution of the predictive model 115 from the provider system 110. Additionally or alternatively, provider system 110 may communicate content with database 130 upon generating content based on the execution of the predictive model 115. In some embodiments, the database 130 may store the received content.

Database 130 may also store data records 132 in local/remote servers or local/remote computing systems. Data records 132 may include various types of application data such as application information (e.g., vendors of one or more applications, inputs and outputs of one or more applications, software version of one or more applications, and the like), information that assesses a relative criticality of one or more applications (e.g., additional applications that depend on the functioning of each of the one or more applications such as downstream or upstream applications), information that indicates problems with each of the one or more applications (e.g., problem logs conveying problems that have occurred with the application), and information that indicates changes to each of the one or more applications (e.g., change logs conveying changes that have been implemented, or will be implanted, on the application, including hardware and/or software changes). The provider system 110 may access database 130 upon being triggered to run the ML platform 112. Database 130 may provide the provider system 110 with large sets of application data which may be filtered and processed by the provider system 110 for use as training datasets.

Figure 2A:
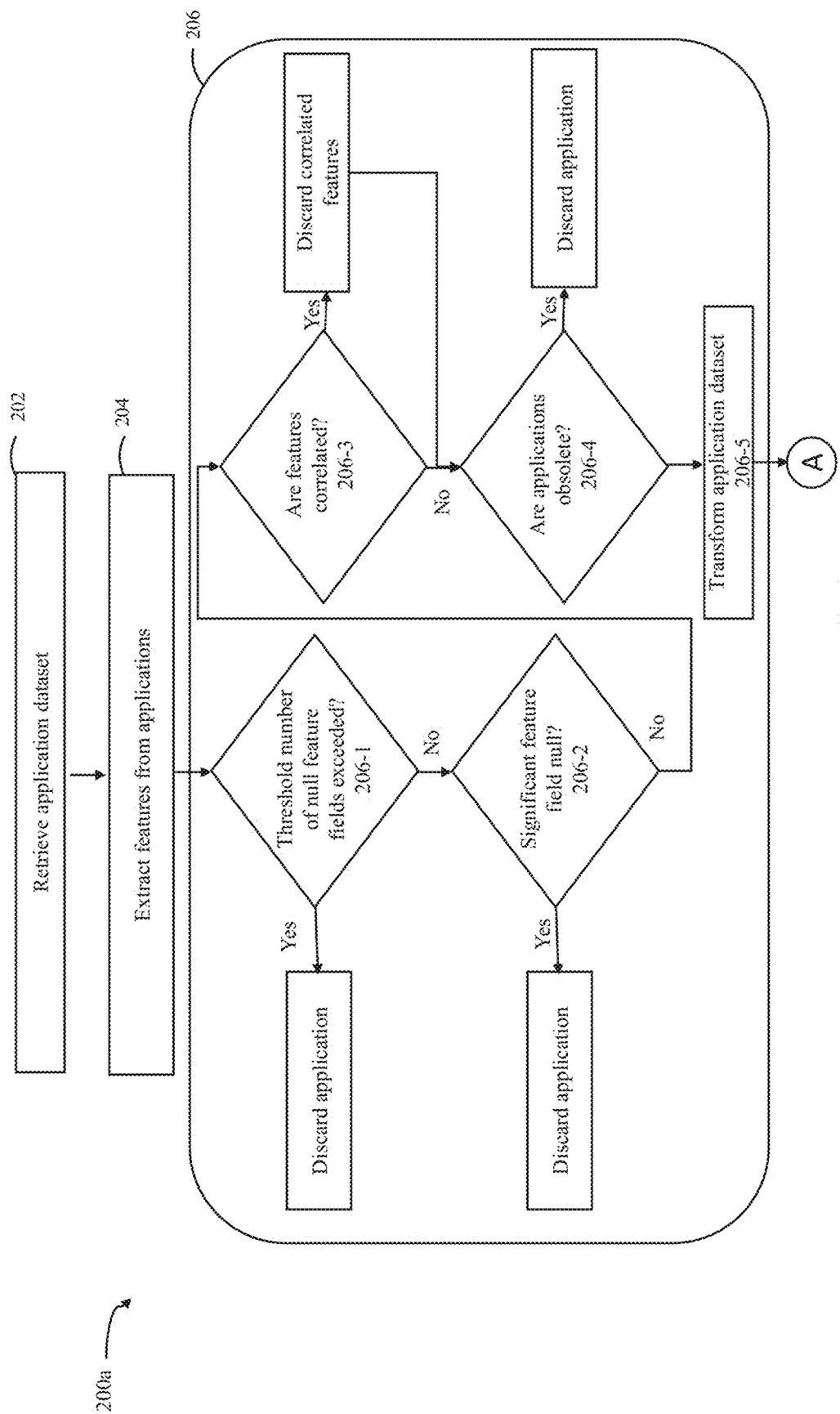
FIGS. 2A-2B depict generating models used to predict the probability of applications that are likely to result in high severity events, according to various potential embodiments.

FIG. 2A depicts an example approach 200a in which a predictive model 115 is generated and trained to so as to develop a predictor or classifier for high severity events, according to potential embodiments. The approach may be implemented by the provider system 110, with involvement by the predictive model training module 114 of ML platform 112 and by data records 132 from one or more databases 130.

At step 202, the provider system 110 may retrieve application data from one or more databases 130. An application dataset may be generated based on the application data retrieved for each application from the data records 132. A training dataset for training the predictive model 115 may be based on the application dataset, such that the training dataset may be generated, for example, by processing the application dataset as further described below. It should be appreciated that embodiments are not limited to the provider system 110 performing the methods described herein. For example, the user devices 120 (or other devices, or some combination of user devices 120 and provider system 110) may perform the methods described herein.

At step 204, features of various applications may be extracted from the application data contained in the application dataset. Features may include those listed below in Table 1.

TABLE 1

Example Features Extracted From Application Data

| Feature | Description | Type |
| --- | --- | --- |
| Application Id | Application internal unique ID | ID |
| SEV12_FLAG | Flag to note if application had a severity 1 or 2 event | Response Variable |
| SEV3_CNT | Number of severity 3 events in rolling 1 year time period | Continuous Variable |
| SEV4_CNT | Number of severity 4 events in rolling 1 year time period | Continuous Variable |
| SEV5_CNT | Number of severity 5 events in rolling 1 year time period | Continuous Variable |
| SEV45_CNT | sum of severity 4 and 5 events in rolling 1 year time period | Continuous Variable |
| TECH_PLAN_FLAG | Flag to note if application has a unique technology plan associated | Discrete Variable |
| CP_Server_Flag | Flag to note if application has a CP (coordination point) server assigned for all its assets | Discrete Variable |
| LOC_200_FLAG | Flag to note if application has a meets the requirement that all its assets should meet the 200 miles distance criterion between production servers and CP servers | Discrete Variable |
| TERS_FLAG | Flag to note if application has assets which meet server standards (e.g., Technology Equipment Recovery Solutions (TERS) flag) | Discrete Variable |
| DRS_FLAG | Flag to note if application has assets which meet the Distributed Resource Scheduler (DRS) criterion | Discrete Variable |
| Plat_DISTRIBUTED_FLAG | Flag to note if application is distributed application or not | Discrete Variable |
| Plat_MAINFRAME_FLAG | Flag to note if application is mainframe application or not | Discrete Variable |
| Plat_MIDRANGE_FLAG | Flag to note if application is a midrange application or not | Discrete Variable |
| MULTIACTIVE_FLAG | Flag to note if application has assets which are in active-active configuration | Discrete Variable |
| Mirroring_Flag | Flag to note if application has mirroring enabled for its assets | Discrete Variable |
| RTO_RPO_FLAG | Flag to note if there is extreme difference between the application RTO (recovery time objective) and RPO (recovery point objective) | Discrete Variable |

TABLE 1-continued

Example Features Extracted From Application Data

| Feature | Description | Type |
| --- | --- | --- |
| UsersAffected | Shows the number of users affected/impacted from the application | Continuous Variable |
| VendorApp | Flag to note if application has a unique technology plan associated | Discrete Variable |
| CONF_DATA_FLAG | Flag to note if application has confidential data | Discrete Variable |
| REST_DATA_FLAG | Flag to note if application has restricted data | Discrete Variable |
| OTHER_DATA_FLAG | Flag to note if application any other type of data which is not confidential or restricted (e.g., public or internal data) | Discrete Variable |
| PAA_FLAG | Flag to note if application is a publicly accessible application (PAA). This indicates application is public facing. | Discrete Variable |
| Tier1_FLAG | Flag to note if application tier as noted in one or more datasets as "Tier 1" | Discrete Variable |
| Tier2_FLAG | Flag to note if application tier as noted in one or more datasets as "Tier 2" | Discrete Variable |
| Tier345_FLAG | Flag to note if application tier as noted in one or more datasets in "Tier 3" "Tier 4" or "Tier 5" | Discrete Variable |
| CountEacoIssues | Variable to show all the Enterprise Availability Coordination Office (EACO) issues in rolling 1 year time period. This provides information related to a business-channel, customer-centric view of availability and performance issues. | Continuous Variable |
| CPProdRatio | Variable to show the ratio of CP servers to Production Servers of an application which are not disposed and/or deleted. | Continuous Variable |
| CountChanges | Variable to show the count of all changes affecting the application in rolling 1 year time period | Continuous Variable |

The provider system 110 may extract, generate, or otherwise determine features from the application data. For instance, change logs may be a portion of the received application data from data records 132. Change logs contain change requests associated with an application. Before an application is changed, a change request may be created that conveys one or more changes to an application. The change request may indicate the parameters of the change and the effects of the change. For example, the change request may predict a number of users affected by the requested change. Further, the change request may indicate the upstream applications, downstream applications, servers, other applications affected by the changed application, and the like. Code snippets, the date the applications are to be changed, and other information may be contained in the change request.

Upon approval of the change request (by system administrators, supervisors, and the like), the change request may be documented in the change log and the requested change may be applied to the one or more applications according to the change request.

Based on the application data (e.g., received change logs), the provider system 110 may determine for instance, the number of changes that a particular application has undergone in the past twelve months, creating the feature "CountChanges" as shown in Table 1. In a different example, the provider system 110 may extract from the change logs, the number of users affected by the application in the past twelve months, creating the feature "UsersAffected" as shown in Table 1.

In some embodiments, a feature may be created that classifies changes. For example, a change involving the replacement of all of the servers might have a different classification than a change involving updating a small portion of the code. Classified changes may be grouped with similarly classified changes. For instance, significant changes such as replacing servers utilized by an application may be grouped in a significant change feature, while minor changes may be grouped in a minor change feature. Accordingly, the extent of change each application has undergone and/or caused may be identified.

In alternate embodiments, instead of extracting features from the application dataset, the provider server 110 may receive a list of features.

At step 206, application data and the associated applications may be pre-processed. In an example, certain application data may be pruned from the application dataset based on the features of the application. For example, as shown in 206-1, if an applications has a number of feature fields (e.g., fields associated with a feature) that are blank (e.g., missing data), and the null feature fields exceed a threshold number of null feature fields (e.g., the answer to the decision is yes), the application may be discarded from the application dataset. For instance, if the provider system 110 cannot extract features for seven feature fields of an application, and the threshold number of feature fields is five, the application and associated application data is discarded from the application dataset.

Alternatively or additionally, as shown in 206-2, applications with null values for certain significant feature fields may be discarded from the application dataset. In various embodiments, groups of users, supervisors, system administrators, the provider system 110, and the like, may determine significant feature fields. For instance, if the provider system 110 cannot extract features for the "UsersAffected" feature field, and the "UsersAffected" feature field is determined to be a significant feature fields, the particular application may be discarded from the application dataset. In certain embodiments, significant feature fields may be identified based on a ranking of the predictive value of feature fields, with one or more of the most predictive feature fields deemed to be significant feature fields.

Additional types of processing may be performed on the application dataset in 206. For example, correlated features may be removed from the dataset. For example, Sev4_flag (the occurrence of a severity type 4 event resulting from an application) and Sev5_flag (the occurrence of a severity type 5 event resulting from an application) may be highly correlated to Sev45_flag (the occurrence of a severity type 4 and/or 5 events resulting from an application). Accordingly, as shown in 206-3, the correlated features (features Sev4_flag and Sev5_flag) may be discarded from each of the applications in the application dataset. The Sev45_flag may be deemed sufficient to convey the information in each of the Sev4_flag and Sev5_flag feature fields respectively. In a different example, duplicative features may be removed from application data in the application dataset.

Additionally or alternatively, particular applications may be removed from the dataset for other reasons. For example, as shown in 206-4, applications may be removed based on whether the application is an obsolete application. That is, the applications may be deleted, disposed, or replaced over time. In a different example, one or more users may flag applications to be removed from the dataset. The provider system 110 may check a status of the application by querying one or more other databases, servers, user devices and the like. Additionally or alternatively, the retrieved application dataset may indicate the status of the applications.

The decisions (206-1 to 206-4) shown in the pre-processing step 206 may be in any order. Further, some decisions (206-1 to 206-4) may be removed and other decisions may be added. In addition to removing features and/or applications of the application dataset during the pre-processing step 206, the application dataset may be transformed, as shown in step 206-5. The data may need to be transformed in generating the training dataset because high severity events may be rare. The probability of an application resulting in a high severity incident should be based on statistically (or algorithmically) determined relationships between the extracted features and high severity events, not the rarity of the high severity events. However, the relationships between the features of applications and the high severity events may be skewed based on the rarity of high severity event data, causing the model trained to predict the probability of high severity events to be skewed.

Random undersampling ("RUS") may be used to down sample data, reducing the effect of the artificially low number of high severity events in the dataset in comparison to the number of low severity events. In some implementations, RUS may be performed by randomly resampling the application dataset. For example, the majority class (low severity events such as severity types 3, 4, and 5) may be assigned a random number. A provider system 110 may select a random subset of the majority class based on the assigned random number, and concatenate the randomly sampled majority class with the full population of the minority class (severity type 1 and 2 events).

Additionally or alternatively, random oversampling ("ROS") may reduce the effect of the artificially low number of high severity events by randomly duplicating data from the minority class (e.g., the applications likely to cause severity type 1 and/or 2 events). Thus, a transformed dataset is created using a more balanced class distribution. The RUS and ROS assume nothing about the data, and are simple and fast to perform on large datasets. However, any appropriate technique of balancing the class distributions may be employed. In an example of sampling the data, for every minority class, there may be data corresponding to 1/43 of the majority class.

When imbalanced classes are normalized and RUS (or other sampling techniques) are implemented, a sampling bias may be created. The effect of the sampling bias may be minimized by including an offset α. The offset may be determined according to Equation 1 below.

$$\alpha = \frac{\log(r_1 * (1 - p_1))}{(1 - r_1) * p_1} \quad \text{Equation (1)}$$

In Equation 1 above, $r_1$ is the proportion of the minority class after sampling (e.g., RUS) and $p_1$ is the rate of the occurrence of the minority class in the original population (e.g., before RUS).

The processes in 214 may be performed by the provider system 110 to generate a model. A purpose of the model is to prioritize applications based on the probability of the application resulting in high severity events. The model may be generated according to supervised learning methods. A supervised leaning method involves training a model using known input/output pairs. In various embodiments, the inputs to the predictive model may be the features in the pre-processed application dataset. The output may be a binary indication of whether each of the applications in the application dataset have previously resulted in a high severity event. Because features were extracted from historic data, the output (whether a particular application resulted in a high severity event) is known. For example, the feature "Sev12_FLAG" may be known for the retrieved training data in the application dataset based on the historic data. For each application in the application dataset, "Sev12_FLAG" may be either 0 (a high severity event did not occur) or 1 (a high severity event did occur).

In various embodiments, process 208 may be performed by the ML platform 112 to fit a model by iteratively determining the independent variables of the model. The independent variables are the features that are indicative of high severity events. In operation, the features may be considered independent variables if the fitness of the model is improved. Modeling techniques such as neural networks, decision trees, Markov chains, Chi-square Automatic Interaction Detector, linear regression, and the like may be employed to determine the relationships between features and high severity events.

As shown in 208-1, a feature (e.g., candidate variable) is selected according to any appropriate selection mechanism. The feature is selected from the extracted features from the pre-processed application dataset. The selected feature will be evaluated to determine whether the feature (e.g., candidate variable) is an independent variable of the model. In one embodiment, linear regression may be employed to determine whether the features are independent variables. Stepwise regression is a technique using the linear regression model that may be employed to iteratively determine whether features are variables. Stepwise regression uses a series of steps to determine whether a feature is an independent variable by adding and/or removing features and determining whether the added and/or removed feature makes the model better (or worse) at determining the relationship between the applications and the occurrence of a high severity event of each of the applications. Features are added to (or removed from) the model at each step based on whether the added (or removed) feature satisfies one or more criteria.

One implementation of stepwise regression uses a forward selection of features. In a forward-selection process, features are added to the model and evaluated, based on a selection criterion. For instance, the added feature is evaluated based on whether the added feature improves the fitness of the model. As shown in 208-2, the selected feature is evaluated based on whether the feature improves the fitness of the model. In one embodiment, in the event that the feature is determined to improve the fitness of the model, the feature becomes an independent variable of the model. Accordingly, as shown in 208-4, the feature is stored as an independent variable. In a different embodiment, in the event the feature is determined to improve the fitness of the model, the feature is periodically tested using a current state of the model (e.g., the model at the current step) to determine whether the feature is an independent variable that improves the fitness of the model. One or more thresholds may be set by a user (or dynamically determined by a computer) to add or remove features.

A different implementation of stepwise regression uses a backward selection of independent variables. In a backward-selection process, a model begins with a certain number of candidate variables (features) and candidate variables are removed from the model at each step of the stepwise regression. The model may be evaluated at each step to determine whether removing the candidate variable improves the fitness of the mode. If the fitness of the model worsens without the candidate variable, the candidate variable will be included back into model. If the fitness of the model improves without the candidate variable, the candidate variable will be discarded. The remaining candidate variables will be considered the independent variables.

An example of a selection criterion that may be employed to determine whether the added (or removed) feature (candidate variable) improves the fitness of the model is the Akaike Information Criteria ("AIC"). AIC evaluates the quality of each model compared to each of the other models (e.g., a model at step 1 and a model at step 2). AIC finds a best model out of each of the compared models based on the model that balances simplicity with accuracy. That is, the model is not too complicated and overfit (e.g., tuned to the particular inputs and outputs used to build the model) or underfit (e.g., unable to realize a relationship between the inputs and outputs). The AIC algorithm may provide a score for each of the models evaluated. A lower score may indicate a superior model.

As shown in 208-3, features (candidate variables) may be added or removed until a stopping criterion is met. For instance, one stopping criterion may be reaching a maximum number of iterations of adding (or removing) features. The maximum number of iterations may be determined by a user. Additionally or alternatively, a stopping criterion may be a predetermined goodness of fit for the model. If the stopping criteria is not met, then the provider system 110 may increment the iteration number, as shown in 208-6, select a new feature, as shown in 208-1, and start a new iteration.

In various implementations, three independent variables (determined using stepwise regression and AIC) were determined to be the features that best model the relationship between the features of an application and an occurrence of severity type 1 and/or type 2. The independent variables were determined to be: the number of changes affecting the application in the past twelve months ("number of changes"), the ratio of servers listed as CP vs production regardless of location ("CP to prod server ratio"), and the Application Tier categorical variable ("application tier"). In other embodiments, other independent variables (and more independent variables) may be used to model the relationship between applications and the occurrence of severity type 1 and/or type 2 events.

In various embodiments, the number of changes independent variable conveys the number of changes that an application has undergone in a period of time. The training data may use data that is, for example, up to twelve months old. Changes could include changes in code. Alternatively, changes could include changes in the server that support the application. Further, the downstream and/or upstream software and/or hardware may be changed, creating changes that affect various applications. The more changes that an application and/or its hardware and software environment have undergone in the past twelve months, the higher the likelihood of that application being a part of a high severity event.

The CP to production server ratio independent variable conveys an infrastructure footprint. That is, the ratio may measure the hardware associated with each application. An application relying on many servers, databases and the like may have a noticeably different ratio than an application relying on only one server. Additionally, the application tier independent variable conveys the criticality of grouped applications with other severity types (for instance, severity types 3, 4 and 5). The application tier may be determined dynamically by provider system 110 and/or by one or more users (system administrators, supervisors, application developers, groups using the application, and the like).

In various embodiments, step 210-1 may be performed by the provider system 110 to determine parameters for the independent variables. Parameters may be determined to tune the independent variables (e.g., the features most indicative of high severity events that were determined in process 208) using any appropriate technique of tuning parameters. In an embodiment, the maximum likelihood estimation solves for the parameters that maximize the likelihood of accurately predicting high severity events. Example values of the parameters for each of the features are shown in Table 2.

TABLE 2

| Parameters determined via Maximum Likelihood Estimates | |
|---|---|
| Parameter | Estimated Value |
| $\alpha$ | −0.7772 |
| Number of Changes Parameter | 0.6583 |
| CP to Prod Server Ratio Parameter | 0.4125 |
| Application Tier Parameter | 0.8608 |

Table 2 also shows the value of an offset $\alpha$, the offset accounting for bias injected into the model via random undersampling, as discussed herein. At step 210-2, the parameters determined from process 210-1 may be stored. For instance, the provider system 110 may store the parameters such that the generated predictive model 115 can be rerun on provider system 110.

In example implementations, the example model generated in process 214 performed well on training data. The sensitivity of the example model on training data was 68%, the specificity of the example model was 81%, and the accuracy of the example model was 80%. Table 3 below depicts example confusion matrices illustrating that the example model was able to predict whether applications would face a high severity type 1 and/or type 2 event.

TABLE 3

Confusion Matrix indicating Predictive Modeling Results for Sev12_flag

|  | Predicted Non-event | Predicted Event |
|---|---|---|
| Non-event | 3975 | 953 |
| Event | 28 | 60 |

As shown in Table 3 above, the example model predicted a true negative (representing that there was not a high severity event resulting from the application) correctly 3975 times. The example model predicted a true positive (representing that there was a high severity event resulting from the application) correctly 60 times. The example model predicted a false positive (representing that the model predicted a high severity event when in fact the application did not have a high severity event in the past twelve months) a total of 953 times. Further, the example model predicted a false negative (representing that the model predicted that there was no high severity event when in fact that application did have a high severity event in the past twelve months) a total of 28 times.

In some embodiments, the sensitivity may be increased such that the likelihood of the model capturing true positive events increases. However, in the event the sensitivity is too high, the model may be more likely to predict false positives. Therefore, a model that finds a better balance where the sensitivity and specificity do not change by a large margin may be employed. Accordingly, modeling techniques such as neural networks, decision trees, Markov chains, Chi-square Automatic Interaction Detector, and the like may be employed.

Cross validation may be used to test the model on holdout data and determine the effectiveness of the model on application data that has not be been fed to the model. However, unlike deployment of the model on live data, in cross validation, the labels of the application data are known (e.g., whether the application has resulted in a high severity event). Cross validation may be performed by partitioning portions of the application dataset into training data and holdout data. In an example, the sensitivity of the example model on the holdout data was 38%, the specificity of the example model was 79%, and the accuracy of the example model was 73%. In some embodiments, holdout data may include data that is before twelve months but not less than twenty-four months.

In some embodiments, a split approach may be used to cross validate the data by randomly splitting the dataset into training data and holdout data. Constraints may be applied to the random split of data. For instance, 70% of the application dataset may be randomly selected for training data and 30% of the application dataset may be randomly selected for the holdout data. In alternate embodiments, k-fold cross validation may be employed. This approach of cross validation allows the use of every data point in both training and testing. In a first step, a dataset may be randomly split into k folds. A higher k value may mean more data may be used for training, but the trained model may be overfit. An overfit model is one that predicts a dataset well, but does not predict unknown data well. In other words, the model was trained to "fit" the training data instead of unknown data. A lower k value may mean there may not be enough data to sufficiently train the model (thereby potentially reducing the effectiveness of the model learning the relationship between the features and the occurrence of high severity events). In a second step, data may be trained with k−1 folds, and the dataset may be validated using the kth fold.

Figure 3:
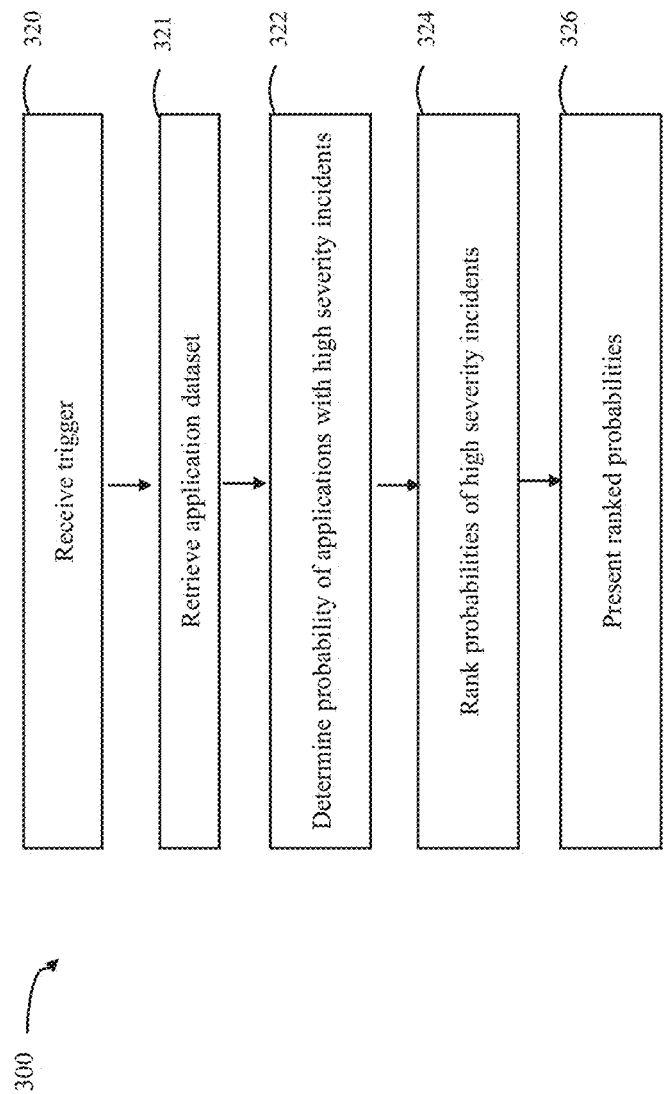
FIG. 3 depicts implementing generated models to predict probabilities of high severity events, according to various potential embodiments.

FIG. 3 depicts an example process 300 implemented by provider system 110 (e.g., prediction unit 116 of ML platform 112), according to potential embodiments. It should be appreciated that embodiments are not limited to the provider system 110 performing the methods described herein. For example, the user devices 120 (or other devices, or some combination of user devices 120 and provider system 110) may perform the methods described herein.

At 320, the provider system 110 may receive a trigger to execute a trained predictive model 115. In some embodiments, the trigger may be based on a periodic schedule (e.g., every four months). Running the predictive model 115 periodically may beneficially produce results that monitor applications over time. Thus, the effectiveness of the corrective measures applied to applications with a high probability of a high severity event may be evaluated.

In alternate embodiments, the trigger may be received in response to a user input. For instance, a user using user device 120 may be interested in running the trained predictive model 115 to identify applications with a high probability of resulting in a high severity incident. Alternatively, the trigger may be received by the provider system 110 in response to certain user actions. For example, in response to a user creating a change request, the provider system 110 may proactively run the predictive model 115 to evaluate whether the proposed change request may increase the probability of a high severity event for the application associated with the change request.

At 321, the provider system 110 may retrieve current application data from one or more databases 130 in response to the trigger. Additionally or alternatively, the provider system 110 may execute the predictive model 115 using application data retrieved from the last time the predictive model 115 was executed (e.g., the provider system 110 may not retrieve any new data from database 130 in the event that the previously retrieved data from database 130 was stored).

Additionally or alternatively, the provider system 110 may generate application data. For instance, application data may be generated in response to a received change request. For example, the change request may estimate an impact to twenty users. Accordingly, the provider system 110 may generate the "UsersAffected" feature and set it to twenty. The generated application data may be based on how the application would change according to the proposed change request. Generating application data for the one or more applications associated with the change request, and executing the predictive model 115 using the generated application data, may beneficially facilitate a user's approval of the proposed change request.

Figure 2B:
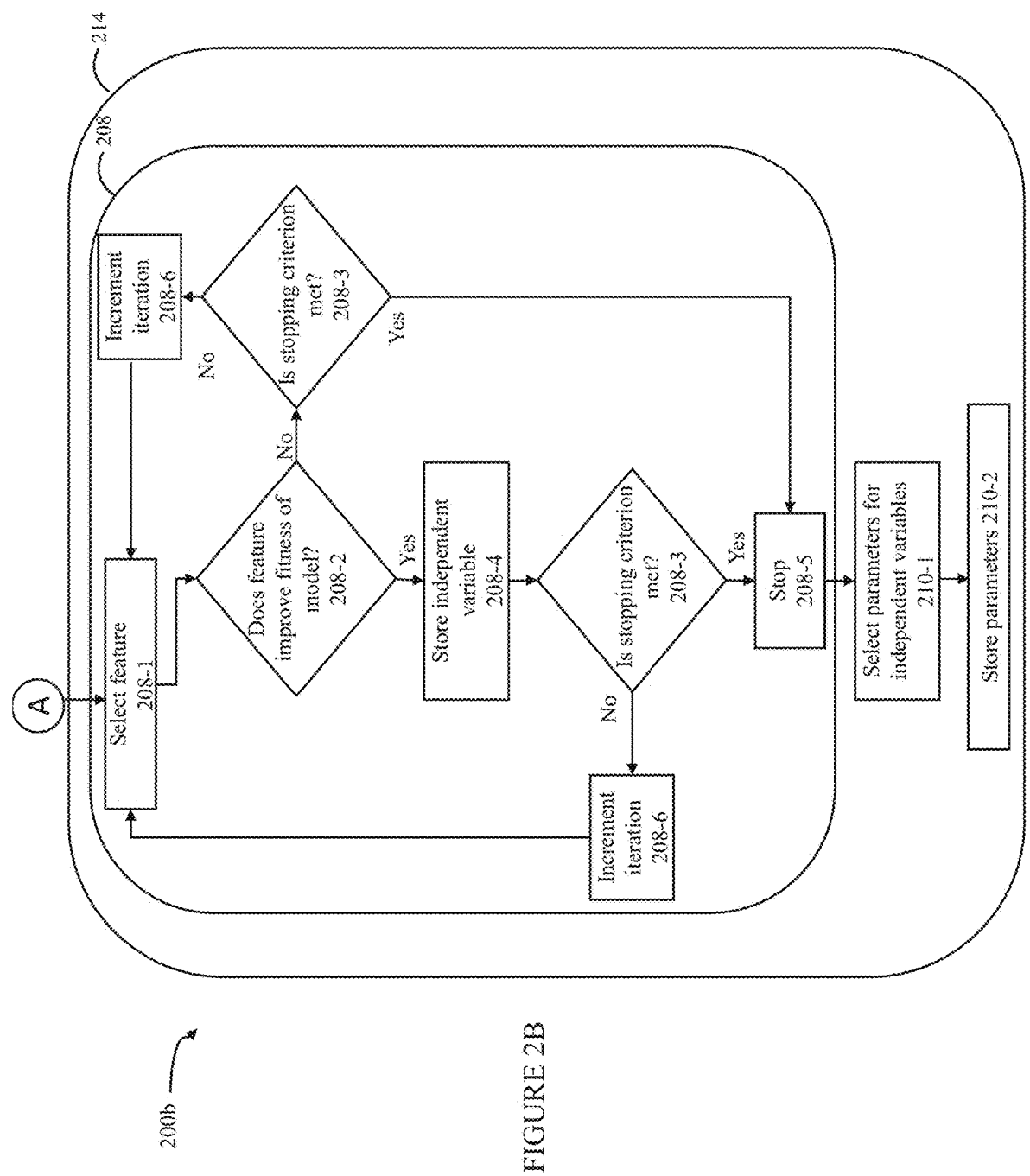

At process 322, the predictive model 115 executed by the provider system 110 may be employed to determine the probability of an application causing a high severity event using the model generated from FIGS. 2A and 2B. The prediction model (e.g., predictive model 115) may be fed pre-processed feature data (e.g., the provider system 110 may perform step 204 and process 206 from FIG. 2A) of various applications. The probability of an application resulting in a high severity event may be determined using the logistic regression model shown in Equation 2 below.

$$\log(p) = \ln\frac{p}{1-p} = \alpha + \beta x \qquad \text{Equation 2}$$

In Equation 2, p is the probability that an event of severity type 1 or 2 may occur, $\alpha$ is an offset and $\beta$ represents the weighting parameters of the independent variables (e.g., the number of changes, the CP to production server ratio, and the application tier) stored from FIG. 2A. The probability p may be determined as shown in Equation 3 below.

$$\hat{p} = \frac{e^{\alpha+\beta x}}{1+e^{\alpha+\beta x}}$$

$$\hat{p} = \frac{e^{\alpha+\beta_0 x_0 + \beta_1 x_1 + \beta_2 x_2}}{1+e^{\alpha+\beta_0 x_0 + \beta_1 x_1 + \beta_2 x_2}} \qquad \text{Equation 3}$$

At 324, the applications fed to the predictive model 115 may be ranked according to the likelihood of applications that are the most likely to experience a high severity event to applications that are less likely to experience a high severity event. In other embodiments, the applications may be ranked according to the likelihood of the applications that are the least likely to experience a high severity event to applications that are more likely to experience a high severity event. The applications may be ranked such that a user may prioritize working on applications such that the probability of point of failure applications (e.g., applications with a high probability of resulting in a high severity event) may be reduced.

At step 326, the ranked probabilities of the applications may be displayed to one or more users. In some instances, the user who triggered the execution of the predictive model 115 may be displayed the results (output) of the model. Additionally or alternatively, various users may be displayed the results of the predictive model 115. Further, the results of the predictive model 115 may be stored by user devices 120 and/or the provider system 110.

Figure 4:
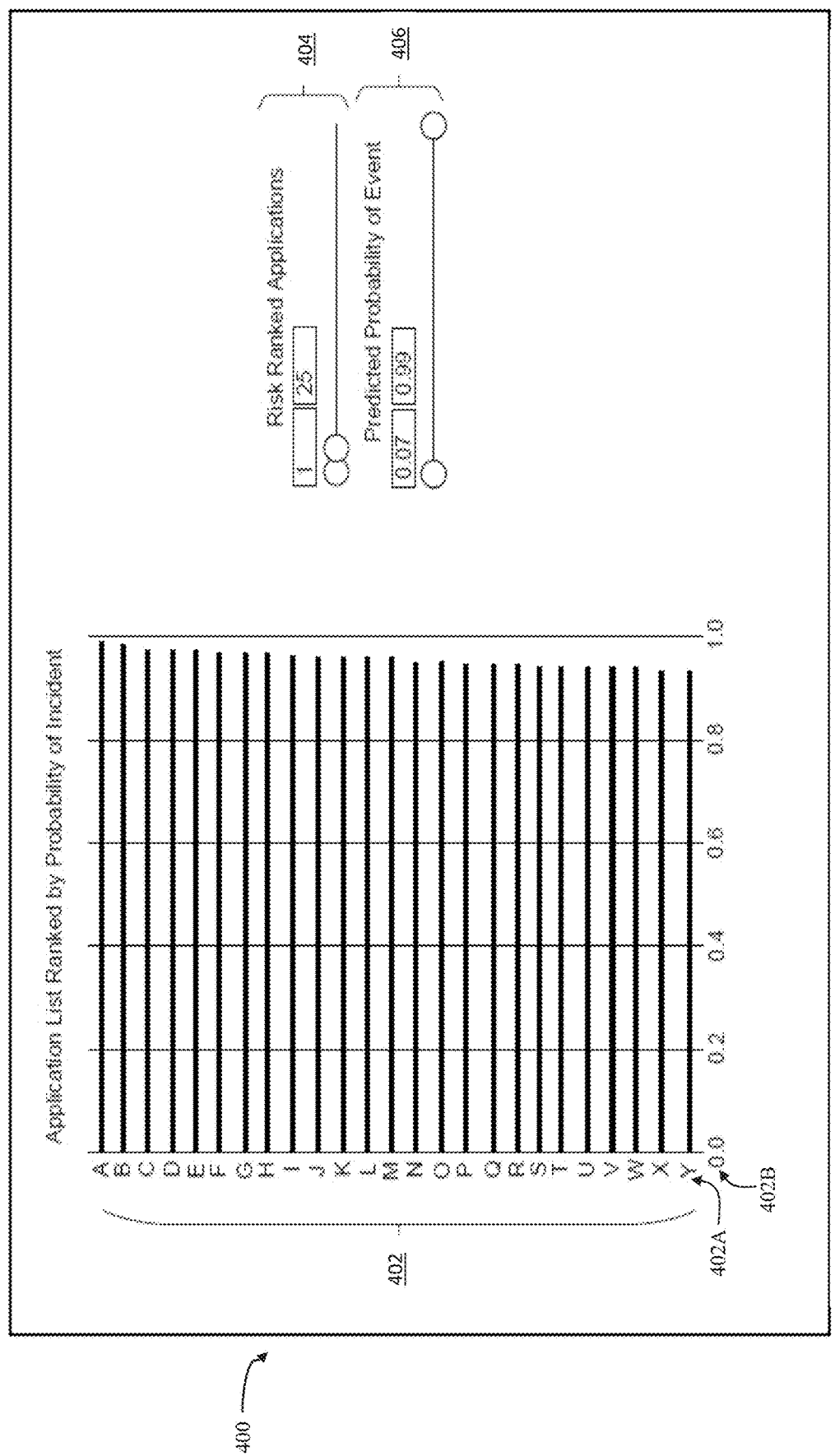
FIG. 4 depicts ranking probabilities of high severity events of various applications, according to various potential embodiments.

FIG. 4 depicts an example graphical user interface ("GUI") 400 presented (via, e.g., a user device 120 and/or provider system 110) illustrating a prediction report of applications resulting in high severity events. The high severity events may indicate a high likelihood of a failure that may, for example, result in an IT or operational disruption in the enterprise. In various embodiments, a user may not have access to the graphical user interface unless one or more security verifications are performed. For example, the user interface 122 may use sensors to determine credentials (e.g., biometrics) of a user and evaluate whether the user has access to the prediction report. Additionally or alternatively, the client application may compare credential information received from a user to stored credential information (e.g., passwords, usernames, and/or other login credentials).

Graph 402 in GUI 400 represents a list of displayed applications A-Y. The application A at the top of the graph has the highest probability of causing a high severity event while application Y at the bottom of the graph has the lowest probability of causing a high severity event. The graph 402 may rank the applications according to the probability of high severity events associated with various applications based on the outputs of predictive model 115. The x-axis (402B) of graph 402 represents the probability of a high severity event (from 0 (0% likelihood) to 1 (100% likely)), and the y-axis (402A) of graph 402 shows the various applications that were fed to predictive model 115. As shown, most of the applications displayed have a high probability of causing a high severity event, with application A at about 98% down to about 92% for application Y.

Slider 404 may allow a user to slide a bar to a certain number of applications to be displayed by graph 402. As shown, slider 404 sets the provider system 110 to display applications 1 through 25 (e.g., applications A-Y). Other interactive buttons may be employed. The graph at 402 shows the number of applications displayed according to slider 404. In the current example, application A has the highest probability of a high severity event and is the first application in the graph.

Figure 5:
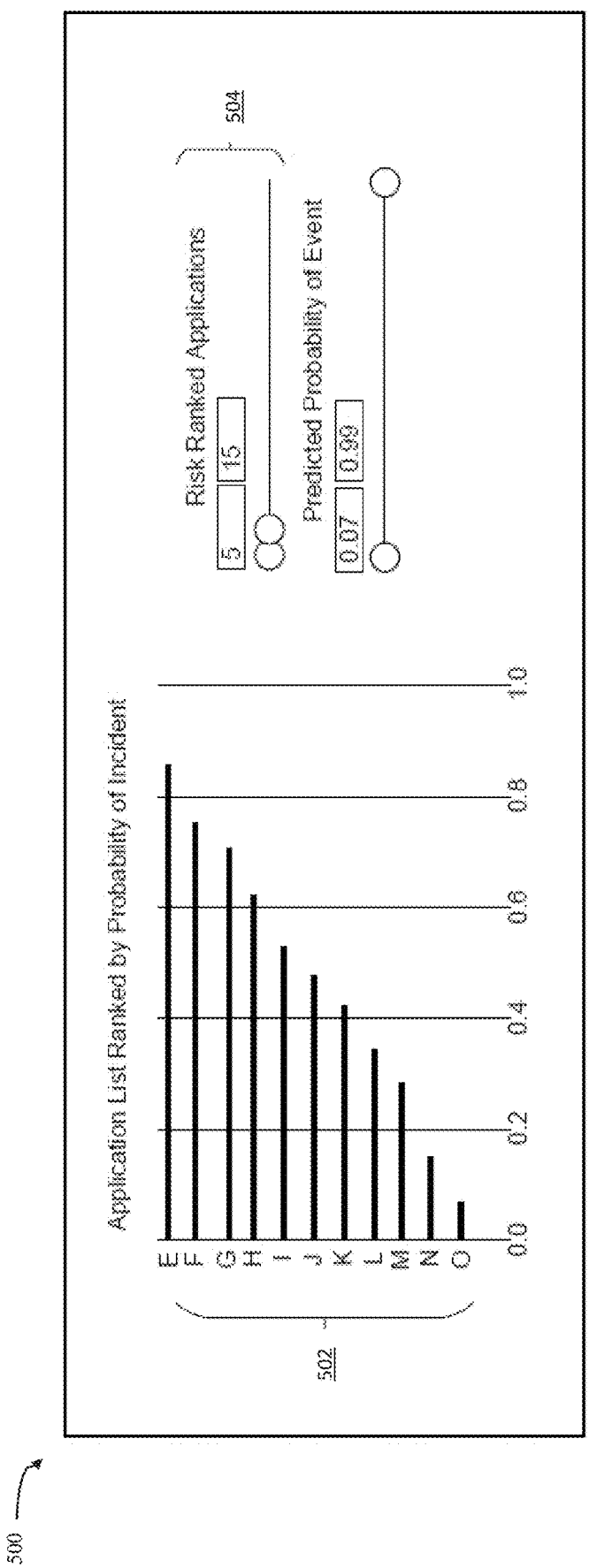
FIG. 5 depicts an alternate example of ranking probabilities of high severity events of various applications, according to various potential embodiments.

Referring to FIG. 5, depicted is an example GUI 500 (presented via, e.g., a user device 120 and/or provider system 110) illustrating an alternate example prediction report of applications resulting in high severity events. A user may interact with slider 504 to select a variable number of applications to display on GUI 500. As shown, the user has selected a fraction of applications to be displayed (e.g., applications 5 through 15). Accordingly, applications E through O (associated with the 11 applications in the range of applications 5 through 15) are displayed on graph 502. Application E may be displayed at the top of the graph because it has the highest probability of causing a high severity, but a different application such as Application A (as shown in FIG. 4) still has the highest probability of causing a high severity event in total. Similarly, application O may have the lowest probability of causing a high severity event but there may be other applications with lower probabilities of causing high severity events that exist but are not displayed (e.g., application Y shown in FIG. 4).

Referring back to FIG. 4, in some embodiments, a scroll button may be used (currently not shown) in accordance with GUI 400 such that the user may scroll through all of the applications. For instance, a user may interact with an interactive button such as an arrow indicator to view additional elements of graph 402. That is, graph 402 may extend to various digital pages. In alternate embodiments, a search feature may be implemented on GUI 400 such that a user may search for a particular application.

In some embodiments, a user may click on an application and observe the features of that application that were used to evaluate the application's probability. For example, clicking on an application may allow a user to view the number of changes that were logged with respect to the clicked-on application. All of the features in Table 2, including the values in the feature fields, may be viewed in the event that the user interacts with an application in graph 402.

Slider 406 may allow a user to slide a bar to indicate (or otherwise input) a probability range. The provider system 110 may limit the displayed graph 402 to display only the applications in the probability range set by slider 406. For example, as shown, slider 406 currently sets the provider system 110 to display applications with probabilities of high severity events in the range of 0.07 and 0.99 in graph 402. In contrast, a user may be interested in viewing applications in a certain range of probabilities. For example, a user may want to view applications that have a low probability of causing high severity events, and may set slider 406 to 0.00-0.50. Accordingly, provider system 110 may display applications with probabilities of high severity events in the range of 0.00-0.50.

Figure 6:
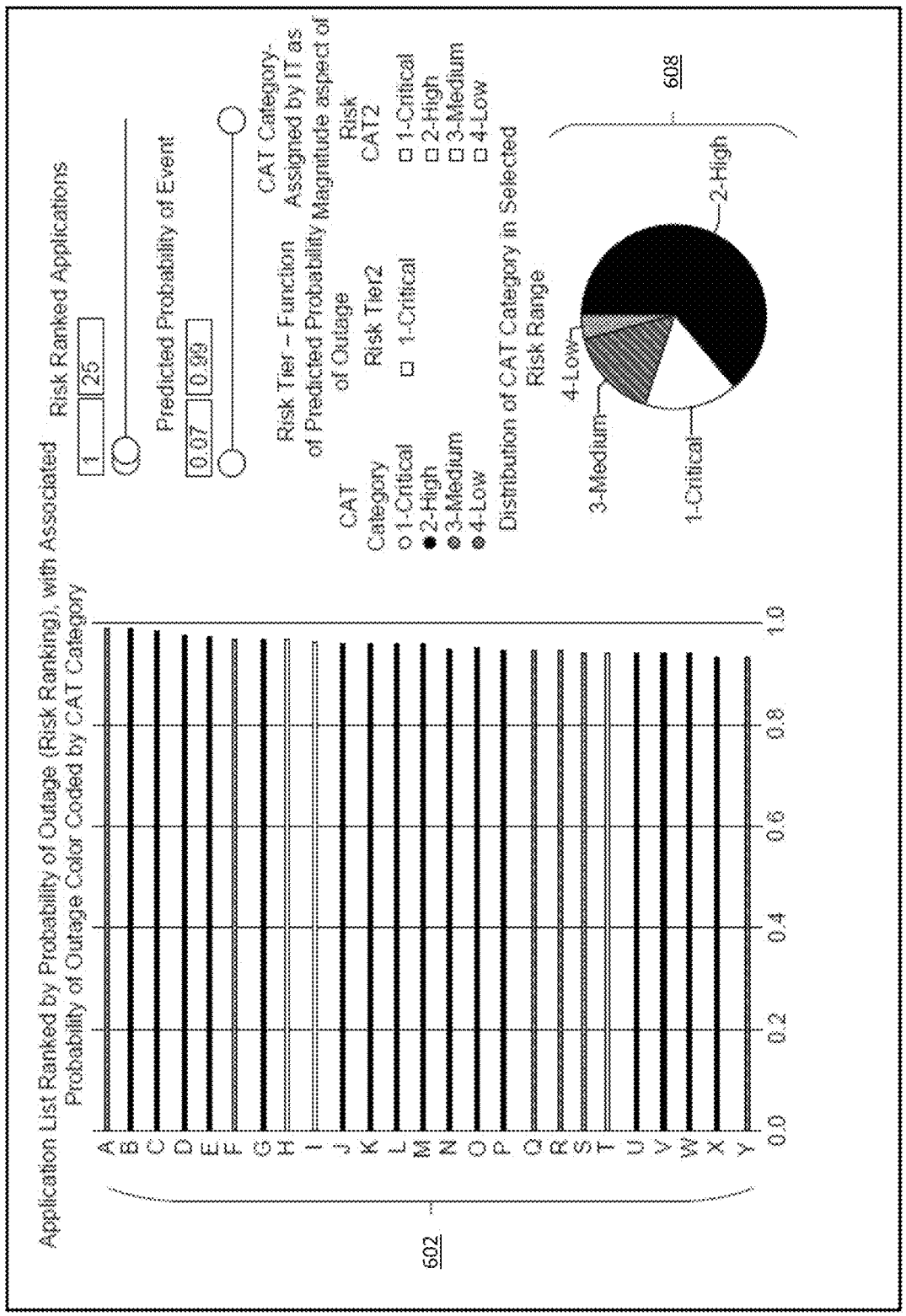
FIG. 6 depicts ranking probabilities of high severity events of various applications in conjunction with one or more additional ranking criteria, according to various potential embodiments.

FIG. 6 depicts an example GUI 600 presented (via, e.g., a user device 120 and/or provider system 110) illustrating a prediction report of applications with high severity events modified by a second ranking criteria. In some embodiments, a user may toggle between the GUI displaying the prediction report of applications with high severity events (FIG. 4) and the GUI displaying a prediction report of applications with high severity events modified by a second ranking criteria (FIG. 6).

In some embodiments, one or more users may rank the criticality of various applications (e.g., a second ranking criteria) based on the importance of the application to that group of users. The users may input the ranks and/or the ranking mechanism using the GUI. For example, a group of users may manually classify or reclassify certain applications using a Critical Application Tool ("CAT"). An example of user defined criticality scores (e.g., the second ranking criteria) is shown in Table 4 below. Chart 608 describes a distribution of rankings of applications in a particular severity event type based on the user-defined CAT scores.

TABLE 4

| CAT Defined Event Scores | | | |
|---|---|---|---|
| Critical | High | Medium | Low |
| Critical ≥ 0.9 | 0.9 > High ≥ 0.7 | 0.7 > Medium ≥ 0.5 | Low < 0.5 |

In an embodiment, applications may be classified using the CAT score based on one or more user's experience. For example, user experience with an application may result in the user (or group of users) classifying the application as failing 60% of the time. Thus, the application may be classified as being a medium application. A different group may classify applications according to different experiences. For instance, the same application may be classified differently to a different group of users. For example, an application used every day may be considered a critical application to that group of users.

Additionally or alternatively, users may manually classify and reclassify applications based on whether the application interfaces with one or more third parties. For example, users may classify applications that interact with third parties directly as critical application because the failure of the application may disrupt third party experiences with the application.

The CAT scores may be fed as an input into the predictive model 115. For instance, one or more features may be extracted from the application dataset that represent or are otherwise associated with the CAT score (or other ranking system) of each of the applications in the dataset. The CAT score may be treated as an independent variable of the model and considered in the determination of the probability of applications causing high severity events. Alternatively, as shown, the CAT scores may be displayed in conjunction with the results from predictive model 115.

Various groups of users may have various classifications for prioritizing or otherwise identifying the criticality of various applications. Thus, the computer generated ranking (e.g., the ranking based on the output of the predictive model 115) may be customized according to various teams of users. That is, different users may interpret the predictive model 115 rankings in different ways based on unique secondary ranking criteria.

In some embodiments, the CAT score may be depicted on GUI 600 to help a user familiar with the CAT score put the output of the predictive model 115 in context. That is, the displayed output of the predictive model 115, while prioritizing high severity applications according to the same method (e.g., the method described in FIGS. 2A-3), may adapt to various groups of users. The various groups of users may understand the output of the predictive model 115 without further instruction, significant discussion or additional help. Accordingly, the groups of users may promptly mitigate the identified one or more applications with high likelihoods of resulting in high severity events.

As shown, the CAT scores are displayed in conjunction with the ranked probabilities of the predictive model 115. For example, visual identifiers may be used to identify the CAT score used in conjunction with the output (ranked probabilities) of the predictive model 115. Colors, patterns, shapes, and the like may visually identify the CAT criteria associated with each of the applications.

For example, as shown in FIG. 6, a user may identify application H as having a critical CAT score and prioritize mitigating the risk associated with application H even though other applications have a higher probabilities of causing high severity events according to the output of the predictive model 115. Tools like the CAT score may help a user determine which application to prioritize given a group of applications with very similar probabilities. For example, all of the applications shown in FIG. 6 were predicted by the predictive model 115 to have a high probability of causing a high severity event. The second ranking criteria may help a user determine which application to prioritize given the results of the predictive model 115.

Figure 7:
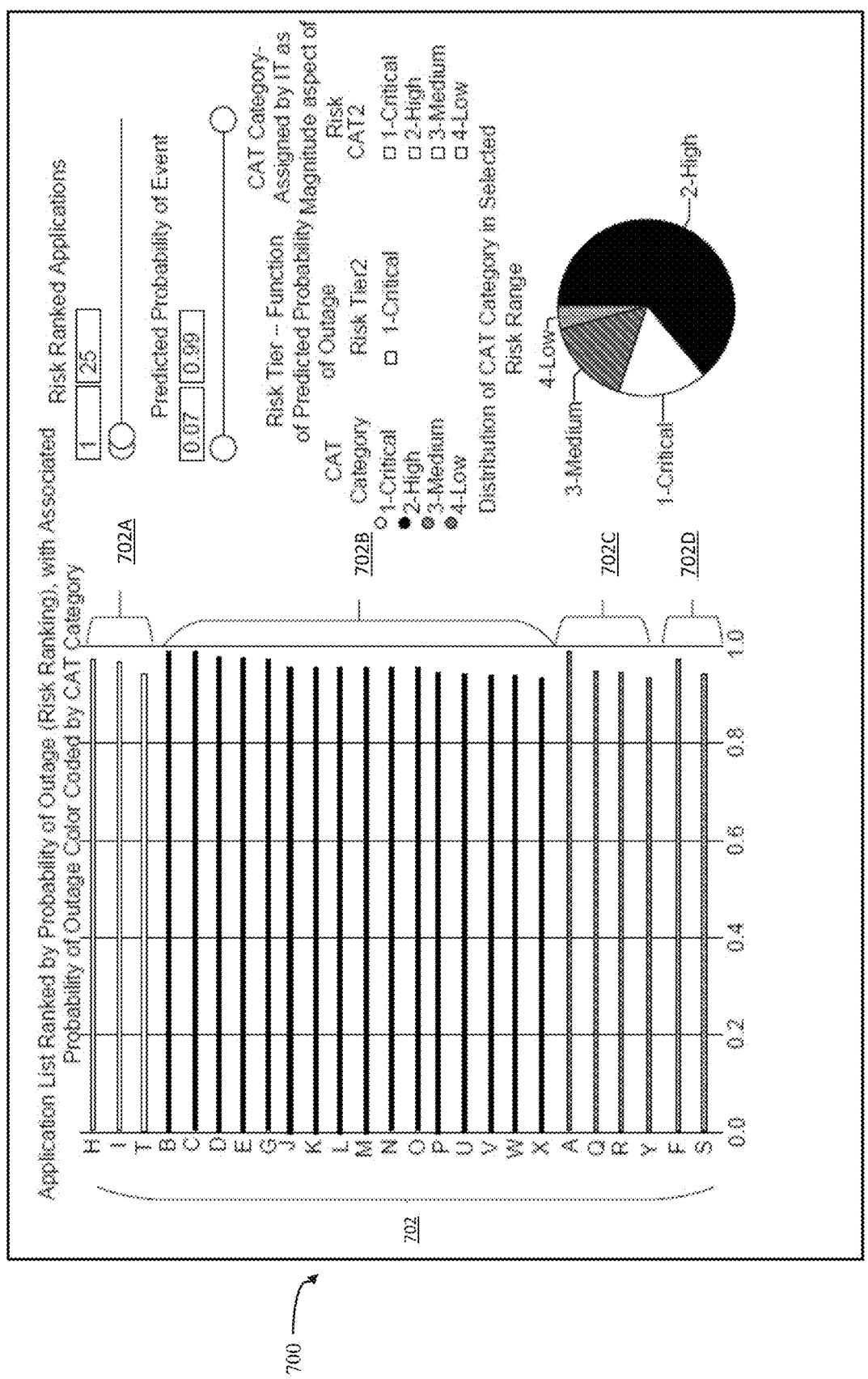
FIG. 7 depicts ranking probabilities of high severity events for various applications modified by a second ranking criteria, according to various potential embodiments.

Referring to FIG. 7, example GUI 700 may be presented (via, e.g., a user device 120 and/or provider system 110) illustrating an alternate embodiment of a prediction report of applications likely causing high severity events modified by a second ranking criteria. As shown, the CAT scores (second ranking criteria) may be incorporated into the GUI 700 such that the applications may be ranked and displayed, based on the probability of the application causing high severity events in combination with the CAT scores of each application. As shown, the applications may be ranked according to clusters of their CAT score. For instance, all displayed "critical" CAT score applications may be ranked in a "critical" CAT score cluster (702A), all displayed "high" CAT score applications may be ranked in a "high" CAT score cluster (702B), all displayed "medium" CAT score applications may be ranked in a "medium" CAT score cluster (702C), and all displayed "low" CAT score applications may be ranked in a "low" CAT score cluster (702D). In alternate embodiments, all "critical" CAT score applications may be ranked and displayed in a "critical" CAT score cluster before all "high" CAT score applications. That is, a page of the GUI may display only applications and their associated high severity event probabilities that are classified as "critical" by the CAT ranking criteria.

Figure 8:
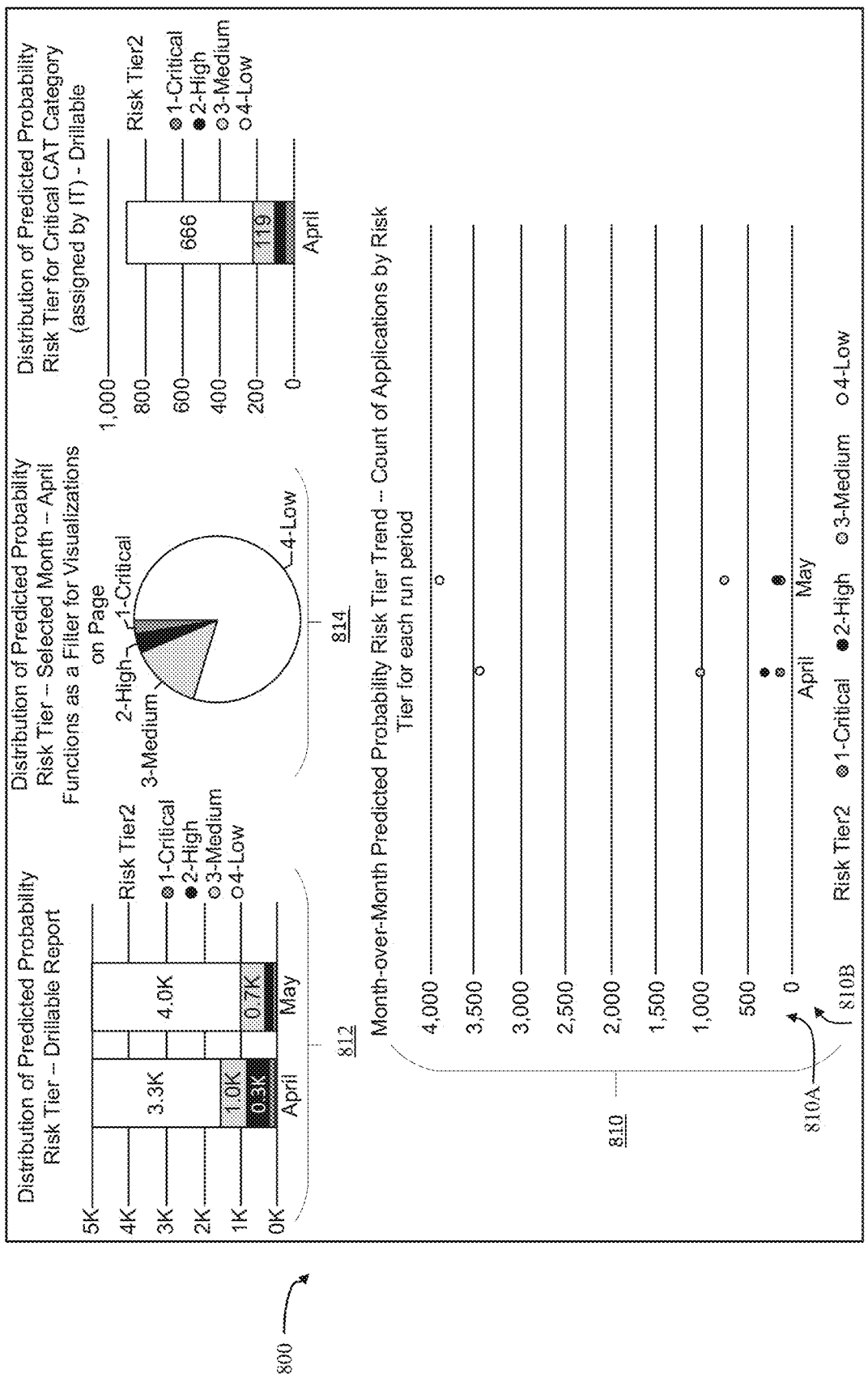
FIG. 8 depicts various types of severity events of various applications over time, according to various potential embodiments.

FIG. 8 depicts an example GUI 800 presented (via, e.g., a user device 120 and/or provider system 110) illustrating the probability of a particular type of events of various applications over time. Graphs 810 and 812 may be alternate embodiments describing similar information. As shown, graphs 810 and 812 convey the number of applications, broken up according to the CAT scores, for severity type 2 events over the months of April and May. In some embodiments (not shown) numeric information may be overlaid on graph 810. Further, a graphical indicator may be displayed (not shown) that indicates whether the number of applications according to a selected CAT score has increased or decreased between one or more selected months (e.g., the trend of the applications according to a selected CAT score).

As shown on graph 810, the y-axis (810A) may represent the number of applications with certain CAT critical scores and the x-axis (810B) may identify months. In some embodiments, CAT score visual identifiers may be added to provide context for users. For example, a user may prioritize an application with a high probability of causing a high severity event and reduce the probability of the application causing a high severity event over time. Thus, graph 810 shows the number of critical and high applications decreasing over time (if the critical and high applications were prioritized by users) while the number of medium and low applications may increase. Chart 814 shows the CAT score of various applications for a particular month.

Figure 9:
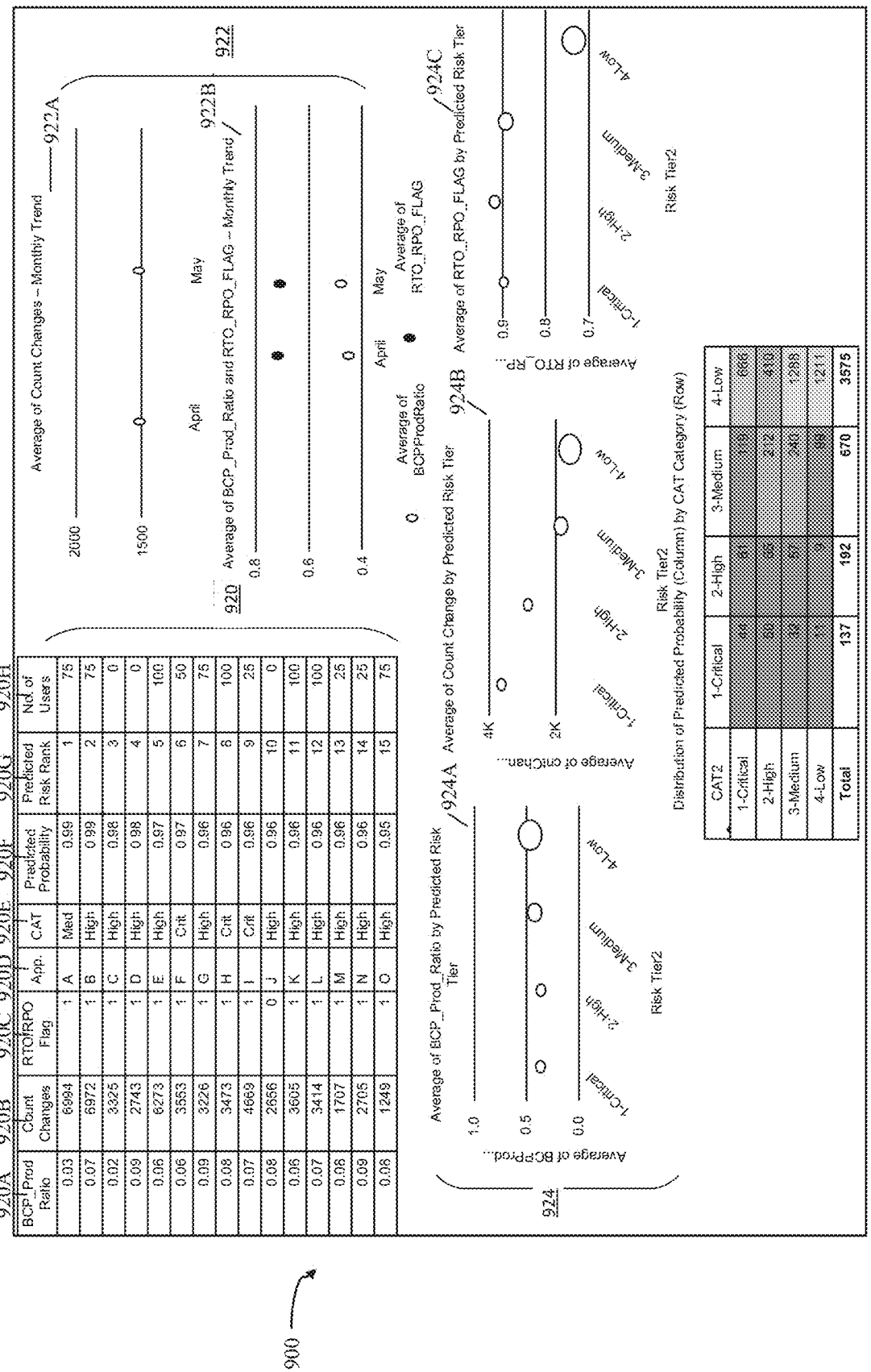
FIG. 9 depicts features used for predicting high severity events, according to various potential embodiments.

FIG. 9 depicts an example GUI 900 presented (via, e.g., a user device 120 and/or provider system 110) illustrating a developer dashboard, according to an embodiment. The developer dashboard may be used to verify the data fed into the predictive model 115.

Chart 920 describes information related to certain applications. For example, column 920A conveys the CP to production ratio feature of each application, 920B conveys the number of changes feature for each application, 920C conveys whether the application triggered the RTO (recovery time object) and RPO (recovery point object) flag (e.g., whether there is a difference between the application RTO and RPO), 920D conveys the name (or application ID) of each application, 920E conveys the CAT score for each application, 920F conveys the predicted probability of each of the applications to cause a high severity event (e.g., determined from the predictive model 115), 920G conveys the predicted risk rank (e.g., derived from the predictive model 115), and 920H conveys the number of users (e.g., the number of users that may be effected by the application in the event of the high severity application). The number of users may be third party users and/or users using the application internally.

Graphs indicated by 922 (e.g., 922A, 922B) illustrate the features extracted from the application dataset over time. A developer may ensure that the same average numbers of features are extracted when the application dataset is retrieved from database 130. In alternate embodiments, the provider system 110 may display an alert or other flag if the features extracted from the application dataset deviate in excess of a threshold value over time. For example, one or more users may modify the way they store data in database 130 (e.g., changes in a naming convention, or enterprise policy) such that provider system 110 does not retrieve all of the data associated with the each of the applications. In response, the provider system 110 may display an alert to a developer. The developer may determine to retrain the predictive model 115 by performing the processes described in FIGS. 2A-2B.

The graphs indicated by 924 (e.g., 924A, 924B, 924C) illustrate the CAT scores for each of the features in a particular severity type. This information may be helpful to verify that users are manually classifying application criticality consistently.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

It is noted that terms such as "approximately," "substantially," "about," or the like may be construed, in various embodiments, to allow for insubstantial or otherwise acceptable deviations from specific values. In various embodiments, deviations of 20 percent may be considered insubstantial deviations, while in certain embodiments, deviations of 15 percent may be considered insubstantial deviations, and in other embodiments, deviations of 10 percent may be considered insubstantial deviations, and in some embodiments, deviations of 5 percent may be considered insubstantial deviations. In various embodiments, deviations may be acceptable when they achieve the intended results or advantages, or are otherwise consistent with the spirit or nature of the embodiments.

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated modules, units, and/or engines, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the disclosed inventions may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosed inventions and their practical applications to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
   determining, based on a received trigger, a probability of a future event for each application in an application set, wherein determining the probability of the future event for each application in the application set comprises feeding one or more features to a predictive model, the one or more features corresponding to features of each of the applications in the application set, the predictive model tuned to receive the one or more features corresponding to applications in the application set and provide the probability of the future event for each application in the application set;
   ranking the probability of a high-severity event for each application in the application set according to the predictive model;
   displaying the ranked probability of the high-severity event for a number of applications in the application set on one or more pages of a graphical user interface, the graphical user interface having a first graphical element associated with a first probability and a second graphical element associated with a second probability lower than the first probability; and
   in response to a user interacting with the first graphical element and the second graphical element, displaying a subset of applications of the number of applications in the application set, the subset of applications associated with probabilities that are equal to or less than the first probability and equal to or greater than the second probability.

2. The method of claim 1, wherein the future event indicates one or more types of events, each of the types of events defined by one or more thresholds.

3. The method of claim 1, wherein a number of displayed applications of the subset of applications is determined by a user input via an interaction with a graphical component of the graphical user interface.

4. The method of claim 1, further comprising: receiving, by a user input, via an interaction with a graphical component of the graphical user interface, a ranking range, the ranking range modifying a number of displayed applications of the subset of applications according to the ranked probability of the high severity event for the number of displayed applications.

5. The method of claim 1 further comprising: displaying the one or more features of each application in the application set.

6. The method of claim 1, further comprising: displaying application data associated with each of the one or more features, the application data including data used for: determining a relative criticality of each application in the application set, and indicating hardware or software changes for each application in the application set.

7. The method of claim 1, wherein the trigger is received in response to at least one of a user input and a periodic schedule.

8. The method of claim 1, wherein the modification of the ranking of each of the applications in the application set is based on one or more ranking criteria.

9. The method of claim 8, wherein one of the one or more ranking criteria includes a ranking criterion based on one or more user generated rankings.

10. The method of claim 8, further comprising: receiving, by a user input, via an interaction with a graphical component of the graphical user interface, a ranking toggle, the ranking toggle modifying the displayed ranked probability of the high severity event for a number of displayed applications of the subset of applications between displaying the ranked probability of the high severity event for the number of displayed applications of the subset of applications according to the predictive model and displaying the ranked probability of the high severity event for the number of displayed applications of the subset of applications according to one or more ranking criterion.

11. The method of claim 10, wherein the ranking of the ranking criteria is displayed in conjunction with the displayed ranked probability of the high severity event for the number of displayed applications of the subset of applications.

12. The method of claim 11, wherein the ranking criteria is displayed using one or more visual identifiers corresponding to the ranks of the ranking criteria.

13. The method of claim 11, wherein the displayed ranked probability of the high severity event for each application in the application data set are clustered into one or more clusters, the one or more clusters displayed on the graphical user interface.

14. The method of claim 13, wherein the one or more displayed clusters rank each application in the application data set according to the probability of the high severity event based on a rank of the ranking criteria.

15. The method of claim 1 further comprising: displaying, on a sub-interface on the graphical user interface, a number of ranked applications according to a second ranking criteria over a series of months according to a severity event type.

16. The method of claim 15 further comprising displaying on the sub-interface, for a user-determined period of time, a graphical indicator displaying a visualization of a trend.

17. The method of claim 1 further comprising: displaying on a sub-interface on the graphical user interface, a distribution of the ranked probabilities according to a second ranking criteria.

18. The method of claim 1, further comprising receiving one or more sets of ranking criteria, the one or more sets of ranking criteria used to re-tune the predictive model, wherein re-tuning the predictive model includes at least one of:
   supplementing the one or more features for each of the applications in the application set with a set of the one or more sets of ranking criterion;
   identifying a feature subset comprising one or more features that are independent variables, one or more of the independent variables being a ranking criterion from the one or more sets of ranking criteria; or
   re-tuning the predictive model based on a training dataset, the training dataset including the ranking criteria from the one or more sets of ranking criteria.

19. The method of claim 1, wherein the predictive model further receives one or more sets of ranking criteria, the predictive model tuned using one or more sets of ranking criteria and the one or more features.

20. A system comprising a memory having computer-executable instructions, and a processor configured to execute the instructions to:
   determine, based on a received trigger, a probability of a future event for each application in an application set, wherein determining the probability of the future event for each application in the application set comprises feeding one or more features to a predictive model, the one or more features corresponding to features of each of the applications in the application set, the predictive model tuned to receive the one or more features corresponding to applications in the application set and provide the probability of the future event for each application in the application set;
   rank the probability of a high-severity event for each application in the application set according to the predictive model;
   display the ranked probability of the high-severity event for a number of applications in the application set on one or more pages of a graphical user interface, the graphical user interface having a first graphical element associated with a first probability and a second graphical element associated with a second probability lower than the first probability; and
   in response to a user interacting with the first graphical element and the second graphical element, displaying a subset of applications of the number of applications in the application set, the subset of applications associated with probabilities that are equal to or less than the first probability and equal to or greater than the second probability.

* * * * *